(12) United States Patent
Hashimoto et al.

(10) Patent No.: US 7,313,292 B2
(45) Date of Patent: Dec. 25, 2007

(54) OPTICAL COMPONENT USING OPTICAL TRANSMISSION ELEMENT JOINING METAL HOLDER

(75) Inventors: Yoshihiro Hashimoto, Kamakura (JP); Ken Matsuoka, Kamakura (JP); Shinichi Takagi, Amagasaki (JP); Katsunori Suzuki, Hamamatsu (JP); Tetsutsugu Hamano, Iwata-gun (JP)

(73) Assignees: Mitsubishi Denki Kabushiki Kaisha, Tokyo (JP); Yamaha Corporation, Shizuoka-ken (JP)

( * ) Notice: Subject to any disclaimer, the term of this patent is extended or adjusted under 35 U.S.C. 154(b) by 0 days.

(21) Appl. No.: 10/941,940

(22) Filed: Sep. 16, 2004

(65) Prior Publication Data

US 2005/0099703 A1 May 12, 2005

(30) Foreign Application Priority Data

Sep. 19, 2003 (JP) ............................. 2003-328452

(51) Int. Cl.
*G02B 6/12* (2006.01)
*G02B 6/32* (2006.01)
*G02B 6/02* (2006.01)

(52) U.S. Cl. .............................. 385/14; 385/33; 385/39

(58) Field of Classification Search ................. 385/14, 385/33
See application file for complete search history.

(56) References Cited

U.S. PATENT DOCUMENTS 4,506,951 A * 3/1985 Yamada ...................... 359/820
4,778,253 A 10/1988 Siga et al.
5,046,798 A * 9/1991 Yagiu et al. ................... 385/34
5,379,155 A * 1/1995 Goetschmann et al. ..... 359/820
5,523,893 A * 6/1996 Haas .......................... 359/820
5,982,565 A 11/1999 Nomura et al.
6,031,253 A * 2/2000 Kobayashi .................... 257/99
6,269,202 B1 * 7/2001 Lee et al. ..................... 385/24

(Continued)

FOREIGN PATENT DOCUMENTS

DE 31 16 579 A1 6/1982

(Continued)

OTHER PUBLICATIONS

European Search Report Issued Sep. 7, 2005.

(Continued)

*Primary Examiner*—K. Cyrus Kianni
(74) *Attorney, Agent, or Firm*—Dickstein Shapiro LLP (57) ABSTRACT

An optical component comprises an optical transmission element (e.g., an optical lens) whose circumferential wall partially joins a metal holder via a joining material (e.g., a low melting point glass), wherein stress is normally applied to the optical transmission element in a compression direction when joining the metal holder. The optical transmission element is inserted into a through hole of the metal holder, and the joining material is kept in a bank actualized by a tapered portion formed in proximity to one end of the through hole of the metal holder. This prevents tensile stress from being applied to the optical transmission element; thus, it is possible to avoid the occurrence of cracks and separations in the optical transmission element; and it is possible to avoid the occurrence of errors in optical characteristics, regardless of variations of the environmental temperature, so that, the optical component is improved in reliability.

14 Claims, 7 Drawing Sheets

U.S. PATENT DOCUMENTS

| | | | |
|---|---|---|---|
| 6,574,055 B1 | 6/2003 | Stallard | |
| 7,012,757 B2* | 3/2006 | Wallerstein et al. | 359/642 |
| 2002/0075916 A1* | 6/2002 | Sato et al. | 372/36 |
| 2005/0123240 A1* | 6/2005 | Seto et al. | 385/35 |

FOREIGN PATENT DOCUMENTS

| | | |
|---|---|---|
| DE | 41 18 523 A | 8/1992 |
| DE | 41 18 523 A1 | 8/1992 |
| DE | 103 01 265 | 7/2004 |
| EP | 1 182 822 | 2/2002 |
| EP | 05 27 0056 | 11/2005 |
| JP | 02-281201 | 11/1990 |
| JP | 06-201962 * | 6/1994 |
| JP | 08-259262 | 10/1996 |
| JP | 11 110800 | 4/1999 |
| JP | 2000193892 * | 7/2000 |
| JP | 2003-040648 | 2/2003 |
| JP | 2003040648 * | 2/2003 |
| WO | WO 01/99344 | 12/2001 |
| WO | WO-03/081313 A2 | 10/2003 |

OTHER PUBLICATIONS

European Search Report Issued May 11, 2005.

European Search Report issued May 19, 2006.

Ray F. Ciurej, et al., "IP Router Fault Tolerance in the iDen Packet Data System," *Technical Development*, pp. 145-150, Motorola, Inc. 1997.

* cited by examiner

| | THERMAL EXPANSION COEFFICIENT (×10⁻⁷/°C) | | | | NUMBER OF CRACKS | |
|---|---|---|---|---|---|---|
| | OPTICAL LENS (α1) | LOW MELTING POINT GLASS (α2) | METAL HOLDER (α3) | DIFFERENCE (Δα) α3−α2 | AFTER REFLOW | AFTER THERMAL TEST |
| COMPARATIVE SAMPLE 1 (A1) | 65 | 70 | 57 (54Fe29Ni17Co) | −13 | 50/50 (SEPARATION) | |
| COMPARATIVE SAMPLE 2 (A5) | 65 | 70 | 45 (58Fe42Ni) | −25 | 30/50 (SEPARATION) | 50/50 (SEPARATION) |
| EMBODIMENT 1 (A6) | 65 | 70 | 75 (55Fe45Ni) | 5 | 0/50 | 0/50 |
| EMBODIMENT 2 (A7) | 65 | 70 | 78 (54Fe46Ni) | 8 | 0/50 | 0/50 |
| EMBODIMENT 3 (A8) | 65 | 70 | 88 (52Fe48Ni) | 18 | 0/50 | 0/50 |
| EMBODIMENT 4 (A9) | 65 | 70 | 100 (50Fe50Ni) | 30 | 0/50 | 0/50 |
| EMBODIMENT 5 (A10) | 65 | 70 | 105 (48Fe52Ni) | 35 | 0/50 | 0/50 |
| EMBODIMENT 6 (A11) | 65 | 70 | 125 (40Fe60Ni) | 55 | 0/50 | 0/50 |
| EMBODIMENT 7 (A2) | 65 | 70 | 170 (SUS316) | 100 | 0/50 | 0/50 |
| EMBODIMENT 8 (B1) | 33 | 40 | 57 (54Fe29Ni17Co) | 17 | 0/50 | 0/50 |
| EMBODIMENT 9 (B2) | 33 | 40 | 45 (58Fe42Ni) | 5 | 0/50 | 0/50 |
| COMPARATIVE SAMPLE 3 (A3) | 65 | 70 | 175 (SUS316L) | 105 | 2/50 (COMPRESSION) | 10/50 (COMPRESSION) |
| COMPARATIVE SAMPLE 4 (A4) | 65 | 70 | 187 (SUS304) | 117 | 5/50 (COMPRESSION) | 15/50 (COMPRESSION) |

FIG. 8

| \multicolumn{3}{|c|}{OPTICAL COMPONENT A9} | \multicolumn{3}{|c|}{OPTICAL COMPONENT X} |
|---|---|---|---|---|---|
| No. | He LEAKAGE (Pa·m³/sec) | DECISION | No. | He LEAKAGE (Pa·m³/sec) | DECISION |
| 1 | $4 \times 10^{-10}$ | OK | 1 | $7 \times 10^{-9}$ | NG |
| 2 | $4 \times 10^{-10}$ | OK | 2 | $3 \times 10^{-10}$ | OK |
| 3 | $4 \times 10^{-10}$ | OK | 3 | $2 \times 10^{-10}$ | OK |
| 4 | $3 \times 10^{-10}$ | OK | 4 | $4 \times 10^{-10}$ | OK |
| 5 | $2 \times 10^{-10}$ | OK | 5 | $7 \times 10^{-8}$ | NG |
| 6 | $2 \times 10^{-10}$ | OK | 6 | $5 \times 10^{-10}$ | OK |
| 7 | $2 \times 10^{-10}$ | OK | 7 | $2 \times 10^{-10}$ | OK |
| 8 | $2 \times 10^{-10}$ | OK | 8 | $5 \times 10^{-8}$ | NG |
| 9 | $4 \times 10^{-10}$ | OK | 9 | $2 \times 10^{-10}$ | OK |
| 10 | $4 \times 10^{-10}$ | OK | 10 | $2 \times 10^{-10}$ | OK |
| 11 | $4 \times 10^{-10}$ | OK | 11 | $4 \times 10^{-9}$ | NG |
| 12 | $4 \times 10^{-10}$ | OK | 12 | $3 \times 10^{-10}$ | OK |
| 13 | $3 \times 10^{-10}$ | OK | 13 | $3 \times 10^{-10}$ | OK |
| 14 | $3 \times 10^{-10}$ | OK | 14 | $8 \times 10^{-9}$ | NG |
| 15 | $3 \times 10^{-10}$ | OK | 15 | $5 \times 10^{-10}$ | OK |

OPTICAL COMPONENT USING OPTICAL TRANSMISSION ELEMENT JOINING METAL HOLDER

BACKGROUND OF THE INVENTION

1. Field of the Invention

This invention relates to optical components, in which circumferential walls of optical transmission elements such as lenses partially join metal holders via joining materials, and metal holders for holding optical transmission elements.

This application claims priority on Japanese Patent Application No. 2003-328452, the content of which is incorporated herein by reference.

2. Description of the Related Art

Figure 5:
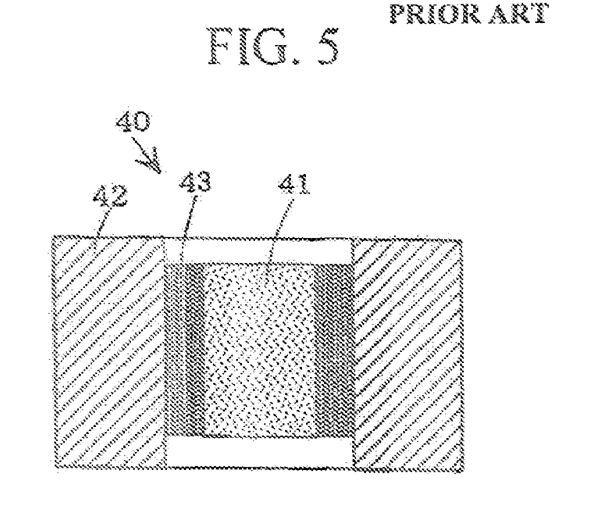
FIG. 5 is a cross-sectional view diagrammatically showing the structure of a conventionally known optical device in which an optical transmission element joins a metal holder via a low melting point glass.

Conventionally, optical devices (or optical components) are designed such that optical transmission elements such as lenses join metal holders via low melting point glasses. FIG. 5 shows an example of the aforementioned optical device, which is disclosed in Japanese Patent Application Publication No. H02-281201. An optical device 40 shown in FIG. 5 is produced using an optical transmission element 41 made of an optical lens having a thermal expansion coefficient of $120 \times 10^{-7}/°$ C., which is arranged inside of a metal holder 42 made of a stainless steel having a thermal expansion coefficient of $170 \times 10^{-7}/°$ C. and which then joins the metal holder 42 via a low melting point glass 43 composed of $PbO\text{---}B_2O_3$ having a softening point of 350° C. and a thermal expansion coefficient of $110 \times 10^{-7}/°$ C.

In the optical device 40 comprising the optical transmission element 41 and the metal holder 42, it is possible to replace the low melting point glass 43 with the adhesive or the alloy solder made of lead and tin. The adhesive generally has a high hygroscopic property, so that optical device 40 using the adhesive may become fragile in certain environmental conditions. In addition, the relatively low glass dislocation temperature reduces the use-allowable temperature range of the optical device 40 using the adhesive, and so-called "outgassing phenomenon" may occur. This causes a problem in that optical devices using the adhesive do not meet long-term reliability.

The alloy solder composed of lead and tin has a relatively low melting point; therefore, when a certain load such as gravity is normally applied to the soldered portion of an optical device, a creeping phenomenon in which the solder becomes deformed over time may easily occur. That is, when the optical transmission element 41 and the metal holder 42 are fixed together using the alloy solder, the position of the optical transmission element 41 may vary over time; therefore, it is very difficult to guarantee the stability of the optical system over a long time. In addition, the alloy solder has a thermal expansion coefficient of $250 \times 10^{-7}/°$ C., which greatly differs from the thermal expansion coefficient of $120 \times 10^{-7}/°$ C. of the optical transmission element 41.

Due to the aforementioned difference of the thermal expansion coefficients, when the optical transmission element 41 is fixed to the metal holder 42 via the alloy solder, a stress is applied to the optical transmission element 41 during the cooling of the alloy solder, which causes cracks and double refraction in the optical transmission element 41. Due to temperature variations or variations of surrounding temperature caused by heating of an electronic circuit and the like, tensile and compressive stresses may be repeatedly applied to the soldered portion. Furthermore, thermal fatigue may cause cracks in the solder so that the optical transmission element 41 may be varied in position and in optical axis.

Because of the reasons described above, the optical device 40 is designed to use the low melting point glass 43.

Figure 6:
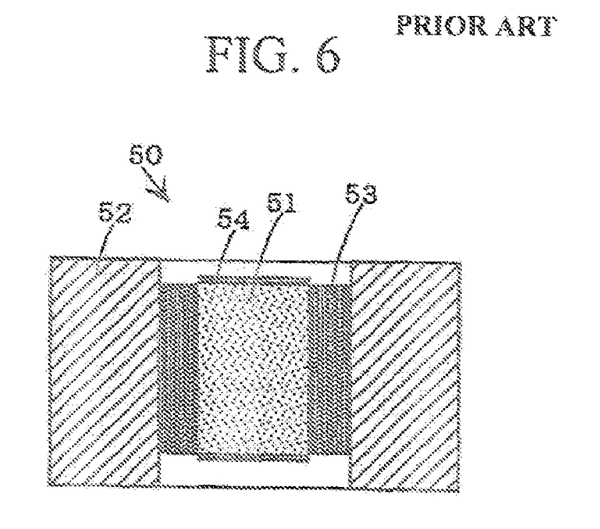
FIG. 6 is a cross-sectional view diagrammatically showing the structure of a conventionally known optical device in which an optical transmission element having antireflection films joins a metal holder via a low melting point glass.

The recent technology introduces vacuum evaporation in forming thin films composed of magnesium fluoride ($MgF_2$), whereby antireflection films are formed on the light incoming surface and light outgoing surface of the optical transmission element (e.g., an optical lens) so as to avoid unwanted reflection of light, thus improving the transmittance. FIG. 6 shows an optical device 50 using an optical transmission element 51, which is improved in transmittance by forming an antireflection film 54 therewith. The optical device 50 of FIG. 6 is produced such that the optical transmission element 51 having the antireflection film 54 is arranged inside of the metal holder 52, and then it joins the metal holder 52 via a low melting point glass 53.

The antireflection film 54 has a heat resistance of 400° C. or less. However, it is difficult for the $PbO\text{---}B_2O_3$ material, which is normally used for the low melting point glass 53, to have a reduced burning temperature of 450° C. or less; that is, it is difficult for the burning temperature of the low melting point glass 53 to be decreased to be equal to the heat resistance temperature of the antireflection film 54 or less. In consideration of environmental protection, it is necessary for harmful materials such as PbO to be eliminated from the low melting point glass 53. However, the low melting point glass 53 has a surface (or surfaces) exposed to the atmosphere other than surfaces thereof joining the optical transmission element 51 and the metal holder 52. This may accelerate the deterioration of the low melting point glass 53 in high humidity environments.

Another type of a low melting point glass that can be subjected to burning at a relatively low temperature, which is lower than that of the low melting point glass 43 mainly composed of a lead glass, is disclosed in Japanese Patent Application Publication No. H08-259262. In addition, another type of an optical device in which an optical transmission element joins a metal holder by using a low melting point glass whose lead content is 0.1 weight % or less is disclosed in Japanese Patent Application Publication No. 2003-40648. Due to the constitution of the optical device in which the optical transmission element joins the metal holder by using the low melting point glass whose lead content is 0.1 weight % or less, the burning temperature can be decreased to 400° C. or less; thus, it is possible to improve the reliability in securing desired optical transmission characteristics. Since the low melting point glass has a relatively low lead content that is 0.1 weight % or less, it is possible to produce the optical device that is environmentally friendly to the earth.

However, due to the intervention of the low melting point glass between the optical transmission element (e.g., an optical lens) and the metal holder in the optical device (or optical component) disclosed in the aforementioned documents, there is a problem in that the incoming light incident on the optical transmission element is varied in optical characteristics. Herein, it may be possible to avoid unwanted reduction of the optical characteristics of the optical transmission element by providing a bank keeping the low melting point glass in the metal holder, wherein it is possible to actualize the condition in which the low melting point glass is eliminated from the periphery of the optical transmission element when the optical transmission element joins the metal holder. However, when a clearance portion between the optical transmission element and the metal holder is filled with the low melting point glass, the optical characteristics must be deteriorated.

When the optical transmission element joins the metal holder by using the joining material such as the low melting point glass, in other words, when the low melting point glass is affixed between the optical transmission element and the metal holder, cracks and double refraction may occur in the optical transmission element due to the stress based on the difference between the thermal expansion coefficients of the prescribed parts, which raises a problem in that a light extinction ratio must be deteriorated. This problem may be solved by using the low melting point glass whose thermal expansion coefficient approximates the thermal expansion coefficient of the optical transmission element. However, due to tensile stress caused by the combination of materials, cracks or separations may easily occur on the surface of the optical transmission element.

SUMMARY OF THE INVENTION

It is an object of the invention to provide an optical component having a high reliability, in which a tensile stress is not applied to an optical transmission element when joining a metal holder, thus preventing cracks and separations from occurring in the optical transmission element.

An optical component of this invention is designed such that the circumferential wall of an optical transmission element partially joins a metal holder via a joining material, wherein a stress applied to the optical transmission element when joining the metal holder is normally directed in a compression direction of the optical transmission element, whereby it is possible to prevent cracks and separations from occurring in the optical transmission element. As a result, it is possible to prevent errors from occurring in optical characteristics, regardless of variations of the environmental temperature. Thus, it is possible to present the optical component having a high reliability.

The above can be evaluated by using a thermal expansion coefficient $\alpha 1$ of the optical transmission element, a thermal expansion coefficient $\alpha 2$ of the joining material, and a thermal expansion coefficient $\alpha 3$ of the metal holder. It is necessary to satisfy the relationship of $\alpha 1 < \alpha 2 < \alpha 3$ by adequately selecting materials for the optical transmission element, joining material, and metal holder, whereby when the optical transmission element joins the metal holder, the stress applied to the optical transmission element can be normally directed in the compression direction of the optical transmission element. Thus, even when the circumferential wall of the optical transmission element partially joins the metal holder, it is possible to reliably prevent cracks and separations from occurring in the optical transmission element.

In the above, prescribed materials should be preferably selected for the optical transmission element, joining material, and metal holder in such a way that a difference between the thermal expansion coefficients of the joining material and optical transmission element, i.e., ($\alpha 2 - \alpha 1$), ranges from $5 \times 10^{-7}/°$ C. to $50 \times 10^{-7}/°$ C., and a difference between the thermal expansion coefficients of the metal holder and joining material, i.e., ($\alpha 3 - \alpha 2$), ranges from $5 \times 10^{-7}/°$ C. to $100 \times 10^{-7}/°$ C. In addition, it is preferable that the thermal expansion coefficient $\alpha 1$ of the optical transmission element ranges from $60 \times 10^{-7}/°$ C. to $80 \times 10^{-7}/°$ C., the thermal expansion coefficient $\alpha 2$ of the joining material ranges from $70 \times 10^{-7}/°$ C. to $90 \times 10^{-7}/°$ C., and the thermal expansion coefficient $\alpha 3$ of the metal holder ranges from $80 \times 10^{-7}/°$ C. to $100 \times 10^{-7}/°$ C. Incidentally, it is preferable that the optical transmission element joins the joining material at two positions or more, which are symmetric to the center axis of the optical transmission element, in order to secure a relatively high joining strength.

The optical transmission element is inserted into a through hole that is formed to penetrate through the metal holder along the center axis, wherein a bank for keeping the joining material is actualized by a tapered portion, which is formed in proximity to one end of the through hole of the metal holder in relation to the optical transmission element, whereby it is possible to prevent the joining material from flowing into other portions other than the joining portion of the optical transmission element inserted into one end of the through hole of the metal holder. That is, the metal holder has the tapered portion serving as the bank, which is filled with a sufficient amount of the joining material. Thus, it is possible to produce the optical component that is superior in the joining strength with the metal holder and in the airtight property. Since this invention reliably prevents the joining material from flowing into other portions other than the joining portion of the optical transmission element inserted into one end of the through hole of the metal holder. This avoids the occurrence of abnormality in optical characteristics of the optical component; hence, it is possible to provide the optical component having a high reliability.

The tapered portion is slanted in an insertion direction of the optical transmission element, which is inserted into the through hole of the metal holder, whereby the thickness of the joining material is reduced along the inclination of the tapered portion. This allows the 'melted' joining material, which is made wet, to flow along the tapered portion of the metal holder due to gravity, whereby it is possible to improve the joining property of the metal holder joining the optical transmission element; hence, it is possible to produce an optical component that is superior in joining strength and airtight characteristics. When the optical transmission element is accompanied with an antireflection film (or AR coating), it is necessary that the joining temperature be lower than the heat-resistant temperature of the antireflection film.

It is preferable that the optical transmission element be made of one of the optical glass, optical crystal, and ceramics. The optical crystal is preferably selected from among quartz crystal, rutile (titanium oxide), garnet, alumina ($Al_2O_3$), lithium niobate ($LiNbO_3$), calcium fluoride (or fluorite) ($CaF_2$), lithium fluoride (LiF), magnesium fluoride ($MgF_2$), barium fluoride ($BaF_2$), thallium iodobromide (KRS-5), thallium bromochloride (KRS-6), sodium chloride (NaCl), potassium bromide (KBr), potassium chloride (KCl), cesium iodide (CsI), and zinc selenide (ZnSe), etc.

The optical glass is preferably selected from among FK (fluorosilicate crown), PK (phosphate crown), ZK (zinc crown), BaK (barium crown), LaK (lanthanum crown), LF (light flint), SF (dense flint), LaF (lanthanum flint), and LsSF (dense lanthanum flint), etc. In particular, it is preferable to use TaF3 (tantalum flint glass), which is manufactured in HOYA Co. Ltd. The shape of the optical transmission element can be adequately selected to suit the application thereof from among the cylindrical shape, spherical shape, planar shape, and prismatic shape, for example. In addition, it is preferable to form an antireflection film whose material is selected from among $SiO_2$, $TiO_2$, $ZrO_2$, and $Ta_2O_5$, etc. on the optical surface of the optical lens in consideration of the material and target reflection ratio of the optical lens. The determination as to the formation of the antireflection film on the optical lens can be made in consideration of the required optical characteristics and applications. That is, an antireflection film is formed on one side of the optical lens;

antireflection films are formed on both sides of the optical lens; or no antireflection film is formed with respect to the optical lens.

It is preferable to select the joining material from among the organic adhesive, low melting point glass, and solder. The organic adhesive is preferably selected from among polyimide adhesive, epoxy adhesive, UV (ultraviolet) adhesive, acrylic adhesive, and urethane adhesive, etc. In addition, the low melting point glass is mainly composed of $SiO_2$ or $B_2O_3$, which is preferably added with $Al_2O_3$, PbO, $Na_2O$, $K_2O$, BaO, $Li_2O$, etc. As the solder material, it is preferable to selectively use the AuSn alloy solder, PbSn alloy solder, SnAgCu alloy solder, and the like. When the solder is used as the joining material, it is necessary to provide a metallized layer in the surrounding area of the optical component.

Furthermore, the material for the metal holder is preferably selected from a Fe—Ni alloy and a Fe—Ni—Co alloy. As the Fe—Ni alloy, it is preferable to selectively use 58Fe42Ni (or 42 Alloy), 55Fe45Ni (or 45 Alloy), 52Fe48Ni (or 48 Alloy), 50Fe50Ni (or 50 Alloy), 48Fe52Ni (or 52 Alloy), 52Fe42Ni6Cr (or 426 Alloy), and 47Fe47Ni6Cr (or 476 Alloy). As the Fe—Ni—Co alloy, it is preferable to selectively use 54Fe29Ni17Co, 55Fe28Ni17Co, and 56Fe27Ni17Co.

As described above, this invention is directed to an optical component in which the circumferential wall of an optical transmission element partially joins a metal holder via joining material, wherein stress is normally applied to the optical transmission element in its compression direction. Thus, it is possible to avoid the occurrence of cracks and separations in the optical transmission element. As a result, even when the environmental temperature varies, it is possible to avoid the occurrence of errors in optical characteristics of the optical component; hence, it is possible to provide the optical component having a high reliability.

BRIEF DESCRIPTION OF THE DRAWINGS

These and other objects, aspects, and embodiments of the present invention will be described in more detail with reference to the following drawings, in which.

DESCRIPTION OF THE PREFERRED EMBODIMENTS

This invention will be described in further detail by way of examples with reference to the accompanying drawings.

Figure 1A:
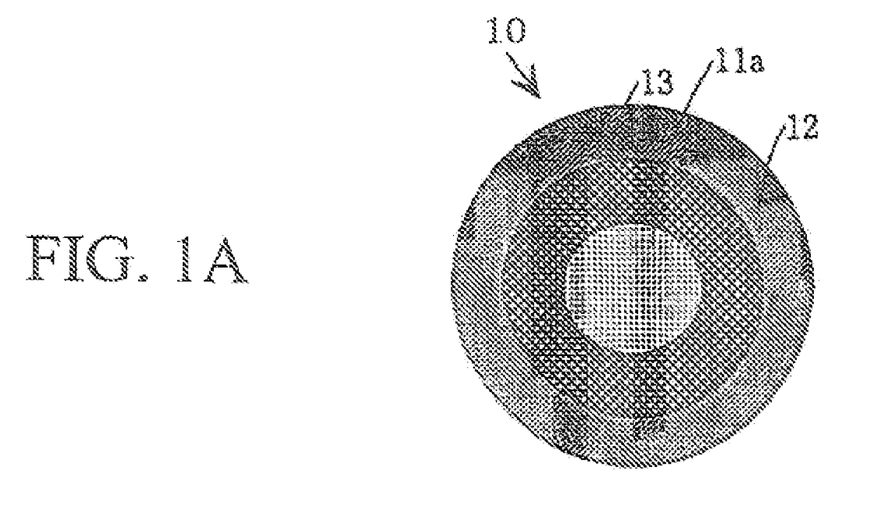
FIG. 1A is an upper view showing an optical component in which an optical transmission element, i.e., an optical lens, joins a metal holder.
Figure 1B:
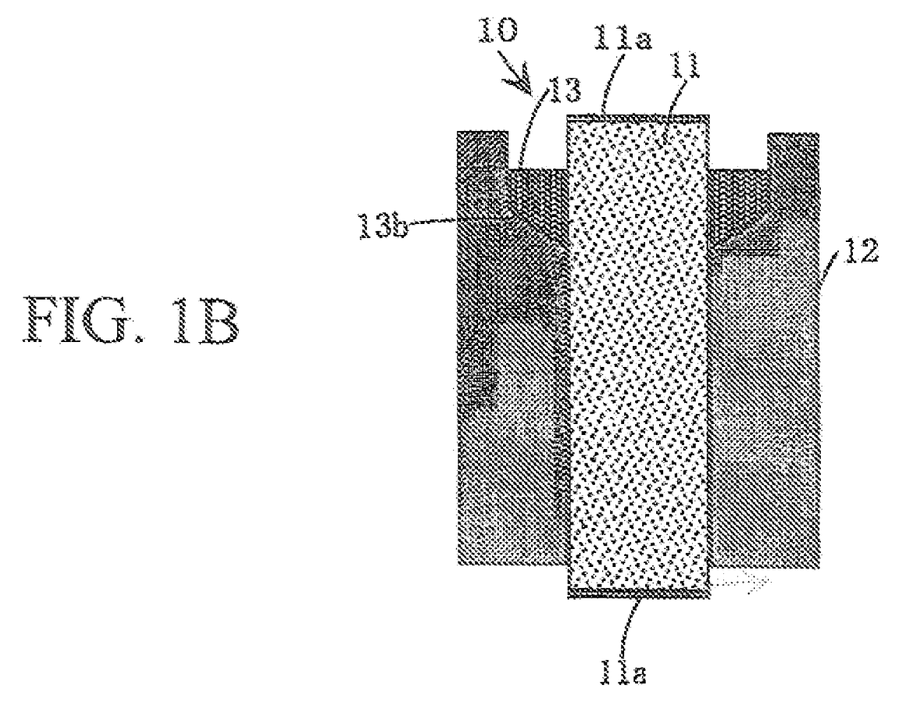
FIG. 1B is a cross-sectional view showing the internal structure of the optical component being cut at a plane vertically passing the center of the illustration of FIG. 1A.
Figure 2A:
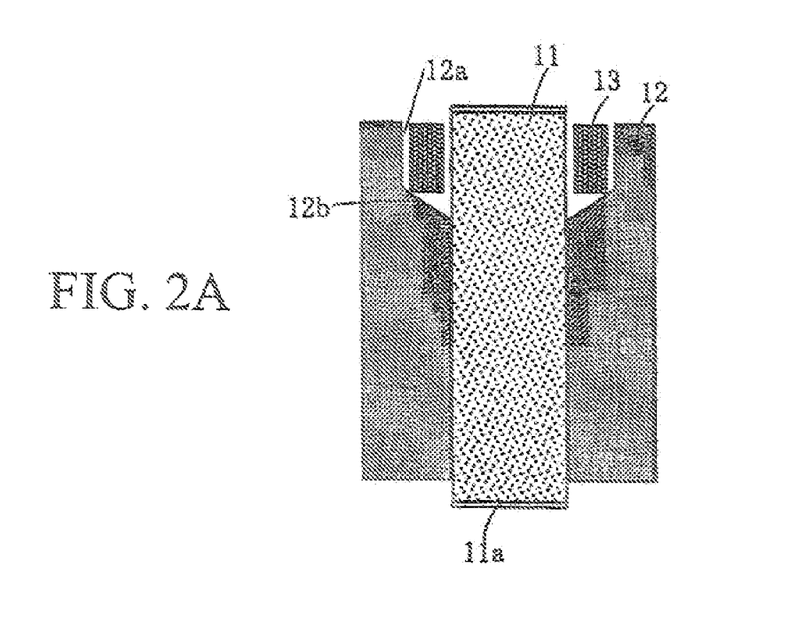
FIG. 2A is a cross-sectional view of the optical component before the optical transmission element completely joins the metal holder.
Figure 2B:
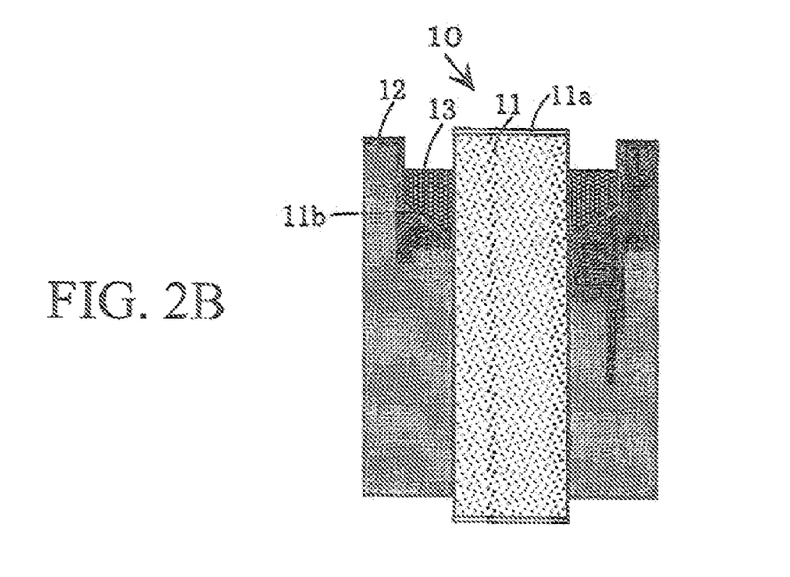
FIG. 2B is a cross-sectional view of the optical component after the optical transmission element completely joins the metal holder.

An optical component in which an optical transmission element, i.e., an optical lens, joins a metal holder will be described with reference to FIGS. 1A, 1B, 2A, and 2B. FIGS. 1A and 1B diagrammatically show an optical component 10 in which an optical lens 11 joins a metal holder 12, wherein FIG. 1A is an upper view of the optical component 10; and FIG. 1B is a cross-sectional view showing the internal structure of the optical component 10 being cut at a plane vertically passing through the center of the illustration of FIG. 1A. FIGS. 2A and 2B show the manner in which the optical lens 11 joins the metal holder 12, wherein FIG. 2A is a cross-sectional view of the optical device 10 before the optical lens 11 completely joins the metal holder 12; and FIG. 2B is a cross-sectional view of the optical device 10 after the optical lens 11 completely joins the metal holder 12.

1. Optical Component

As shown in FIGS. 1A and 1B, the optical component 10 comprises the optical lens 11 roughly having a cylindrical shape, the metal holder (or a metal lens holder) 12 for fixing the optical lens 11 at a prescribed position, and a low melting point glass (i.e., a joining material) 13 that is melt to join the optical lens 11 and the metal holder 12 together. Herein, the circumferential wall of the upper portion of the optical lens 11 partially joins the metal holder 12 via the low melting point glass 13.

As the optical lens 11, it is possible to provide two types of lenses denoted by reference symbols "a1" and "a2", wherein the optical lens a1 is composed of LaSF (i.e., dense lanthanum flint glass) whose thermal expansion coefficient is $65 \times 10^{-7}/°C$., and the optical lens a2 is composed of $SiO_2+B_2O_3+Al_2O_3$ (i.e., boro-silicate glass) whose thermal expansion coefficient is $33 \times 10^{-7}/°C$. Antireflection films 11a are formed on the light incoming plane and light outgoing plane of the optical lens 11. The material for the antireflection film 11a can be selected from among $SiO_2$, $TiO_2$, $ZrO_2$, and $Ta_2O_5$ in consideration of the material of the optical lens 11 and the 'target' reflection ratio. To meet the required characteristics and application, it is possible to adequately handle the antireflection film(s) 11a in such a way that the antireflection films 11a are formed on both of optical surfaces of the optical lens 11, the antireflection film 11a is formed on one of the optical surfaces of the optical lens 11, or no antireflection film is formed with respect to the optical lens 11.

The metal lens holder 12 is formed in a cylindrical shape having a through hole penetrating the center thereof, wherein a chamfered portion 12a having a tapered portion 12b at one end thereof is formed. If there is a possibility that the metal lens holder 12 may be deteriorated due to corrosion, it is preferable that an antirust layer made of anticorrosion nickel plating is formed on the surface of the metal lens holder 12. In addition, it is preferable that the antirust layer made of nickel plating be peeled off from the prescribed portion of the metal lens holder 12 that joins the low melting point glass 13.

As the metal lens holder 12, it is possible to provide eleven types of material b1-b11, wherein b1 comprises a Fe—Ni—Co alloy (or a femico alloy, i.e., 54Fe29Ni17Co) having a thermal expansion coefficient ($\alpha 3$) of $57 \times 10^{-7}/°$ C., which is composed of Fe at 54%, Ni at 29%, and Co at 17%; b2 comprises a stainless steel (SUS316 defined in Japanese Industrial Standard, i.e., JIS) having a thermal expansion coefficient ($\alpha 3$) of $170 \times 10^{-7}/°$ C.; b3 comprises a stainless steel (SUS316L defined in JIS) having a thermal expansion coefficient ($\alpha 3$) of $175 \times 10^{-7}/°$ C.; b4 comprises a stainless steel (SUS304 defined in JIS) having a thermal expansion coefficient ($\alpha 3$) of $187 \times 10^{-7}/°$ C.; b5 comprises an alloy (i.e., 58Fe42Ni) having a thermal expansion coefficient ($\alpha 3$) of $45 \times 10^{-7}/°$ C., which is composed of Fe at 58% and Ni at 42%; and b6 comprises an alloy (i.e., 55Fe45Ni) having a thermal expansion coefficient ($\alpha 3$) of $75 \times 10^{-7}/°$ C., which is composed of Fe at 55% and Ni at 45%.

In addition, b7 comprises an alloy (i.e., 54Fe46Ni) having a thermal expansion coefficient ($\alpha 3$) of $78 \times 10^{-7}/°$ C., which is composed of Fe at 54% and Ni at 46%; b8 comprises an alloy (i.e., 52Fe48Ni) having a thermal expansion coefficient ($\alpha 3$) of $88 \times 10^{-7}/°$ C., which is composed of Fe at 52% and Ni at 48%; b9 comprises an alloy (i.e., 50Fe50Ni) having a thermal expansion coefficient ($\alpha 3$) of $100 \times 10^{-7}/°$ C., which is composed of Fe at 50% and Ni at 50%; b10 comprises an alloy (i.e., 48Fe52Ni) having a thermal expansion coefficient ($\alpha 3$) of $105 \times 10^{-7}/°$ C., which is composed of Fe at 48% and Ni at 52%; and b11 comprises an alloy (i.e., 40Fe60Ni) having a thermal expansion coefficient ($\alpha 3$) of $125 \times 10^{-7}/°$ C., which is composed of Fe at 40% and Ni at 60%.

As the low melting point glass 13, it is possible to provide two types of glass powders c1 and c2. The glass powder c1 is mainly composed of $SiO_2$ and $B_2O_3$ and is added with PbO, so that it is adjusted in such a way that the thermal expansion coefficient ($\alpha 2$) is set to $70 \times 10^{-7}/°$ C., the glass dislocation temperature is set to 315° C., and the joining temperature is set to 350° C. The glass powder c2 is mainly composed of PbO (at 70% or so) and is added with $SiO_2$ and $Al_2O_3$, so that it is adjusted in such a way that the thermal expansion coefficient ($\alpha 2$) is set to $40 \times 10^{-7}/°$ C., the glass dislocation temperature is equal to 300° C. or less, and the joining temperature is set to 350° C. The aforementioned glass powder c1 (or c2) is added with a binder and is subjected to temporary burning after press working, thus forming a low melting point glass preform.

2. Manufacturing Method of Optical Component

A method for manufacturing the optical component 10 (samples of which are denoted by reference symbols A1-A11, B1, and B2) comprising the optical lens 11 (a1, a2), the metal lens holder 12 (b1-b11), and the low melting point glass preform 13 (c1, c2) will be described in detail.

First, as shown in FIG. 2A, the metal lens holder 12 is put into an atmospheric oven that is heated at 300° C., in which it is subjected to oxidation for ten minutes. Then, the low melting point glass preform 13 that is formed in a ring-like shape by press working is put into the space of the chamfering portion 12a that is formed in one end of the metal lens holder 12.

The aforementioned parts are set into a carbon instrument (not shown) and are arranged in a reflow furnace (or a heating furnace), which is then filled with the atmospheric gas containing 40% nitrogen and 60% oxygen, wherein heat treatment is performed for about ten minutes at a reflow velocity of 50 mm/min, at a temperature increasing speed of 10° C./min, and at a maximum temperature of 500° C. Thus, the low melting point glass preform 13 is melted, so that as shown in FIG. 2B, it flows along the tapered portion 12b of the chamfering portion 12a, which is formed in one end of the metal lens holder 12, whereby the space of the chamfering portion 12a is filled with the low melting point glass 13.

Thereafter, annealing treatment is performed in order to eliminate residual distortion (or residual strain) imparted to the optical lens 11 and the metal lens holder 12 when joining together. In the annealing treatment, heat treatment is performed for 100 hours at a temperature of 150° C. in the nitrogen atmosphere; then, cooling is performed so that the temperature is gradually decreased to the room temperature at a temperature decreasing speed of 1° C./min. The aforementioned conditions for the heat treatment can be adequately rearranged in consideration of the sizes and materials of the optical lens 11 and the metal lens holder 12 as well as the material and amount of the low melting point glass preform 13. As described above, various samples (A1-A11, B1, and B2) are produced with respect to the optical component 10, as follows:

First, Comparative sample 1 (i.e., optical component A1) is produced using the optical lens (a1) having a thermal expansion coefficient ($\alpha 1$) of $65 \times 10^{-7}/°$ C. and the low melting point glass preform (c1) having a thermal expansion coefficient ($\alpha 2$) of $70 \times 10^{-7}/°$ C. as well as the metal lens holder 12 composed of a 54Fe29Ni17Co alloy (b1) having a thermal expansion coefficient ($\alpha 3$) of $57 \times 10^{-7}/°$ C. Comparative sample 2 (i.e., optical component A5) is produced using the metal lens holder 12 composed of a 58Fe42Ni alloy (b5) having a thermal expansion coefficient ($\alpha 3$) of $45 \times 10^{-7}/°$ C. Comparative sample 3 (i.e., optical component A3) is produced using the metal lens holder 12 composed of SUS316L (b3) having a thermal expansion coefficient ($\alpha 3$) of $175 \times 10^{-7}/°$ C. Comparative sample 4 (i.e., optical component A4) is produced using the metal lens holder 12 composed of a stainless steel (SUS304 defined in JIS) (b4) having a thermal expansion coefficient ($\alpha 3$) of $187 \times 10^{-7}/°$ C.

Second, Embodiment 1 (i.e., optical component A6) is produced using the optical lens (a1) having a thermal expansion coefficient ($\alpha 1$) of $65 \times 10^{-7}/°$ C. and the low melting point glass preform (c1) having a thermal expansion coefficient ($\alpha 2$) of $70 \times 10^{-7}/°$ C. as well as the metal lens holder 12 composed of a 55Fe45Ni alloy (b6) having a thermal expansion coefficient ($\alpha 3$) of $75 \times 10^{-7}/°$ C. Embodiment 2 (i.e., optical component A7) is produced using the metal lens holder 12 composed of a 54Fe46Ni alloy (b7) having a thermal expansion coefficient ($\alpha 3$) of $78 \times 10^{-7}/°$ C. Embodiment 3 (i.e., optical component A8) is produced using the metal lens holder 12 composed of a 52Fe48Ni alloy (b8) having a thermal expansion coefficient ($\alpha 3$) of $88 \times 10^{-7}/°$ C. Embodiment 4 (i.e., optical component A9) is produced using the metal lens holder 12 composed of a 50Fe50Ni alloy (b9) having a thermal expansion coefficient ($\alpha 3$) of $100 \times 10^{-7}/°$ C. Embodiment 5 (i.e., optical component A10) is produced using the metal lens holder 12 composed of a 48Fe52Ni alloy (b10) having a thermal expansion coefficient ($\alpha 3$) of $105 \times 10^{-7}/°$ C. Embodiment 6 (i.e., optical component A11) is produced using the metal lens holder 12 composed of a 40Fe60Ni alloy (b11) having a thermal expansion coefficient ($\alpha 3$) of $125 \times 10^{-7}/°$ C. Embodiment 7 (i.e., optical component A2) is produced using the metal lens holder 12 composed of a stainless steel (SUS316 defined in JIS) (b2) having a thermal expansion coefficient ($\alpha 3$) of $170 \times 10^{-7}/°$ C.

Third, Embodiment 8 (i.e., optical component B1) is produced using the optical lens (a2) having a thermal expansion coefficient ($\alpha 1$) of $33 \times 10^{-7}/°$ C. and the low melting point glass preform (c2) having a thermal expansion coefficient ($\alpha 2$) of $40 \times 10^{-7}/°$ C. as well as the metal lens holder 12 composed of a 54Fe29Ni17Co alloy (b1) having a thermal expansion coefficient ($\alpha 3$) of $57 \times 10^{-7}/°$ C. Embodiment 9 (i.e., optical component B2) is produced using the metal lens holder 12 composed of a 55Fe45Ni alloy (b6) having a thermal expansion coefficient ($\alpha 3$) of $75 \times 10^{-7}/°$ C.

3. Heat-Cool Cycle Test

Fifty samples are produced with respect to each of the aforementioned optical components A1-A11, B1, and B2, which are subjected to heat-cool cycle testing (or thermal cycle testing) in order to confirm reliabilities thereof. In the heat-cool cycle test, the optical component is cooled down to a temperature of $-40°$ C., which is maintained for 30 minutes; then, it is heated to a temperature of $85°$ C., which is maintained for 30 minutes. This cycle is repeatedly performed 50 times. After the heat-cool cycle test, visual observation is performed using an optical microscope whose magnification is 50 with respect to each of fifty samples produced for each of the optical components A1-A11, B11, and B2 after the heat-cool cycle testing.

Figure 7:
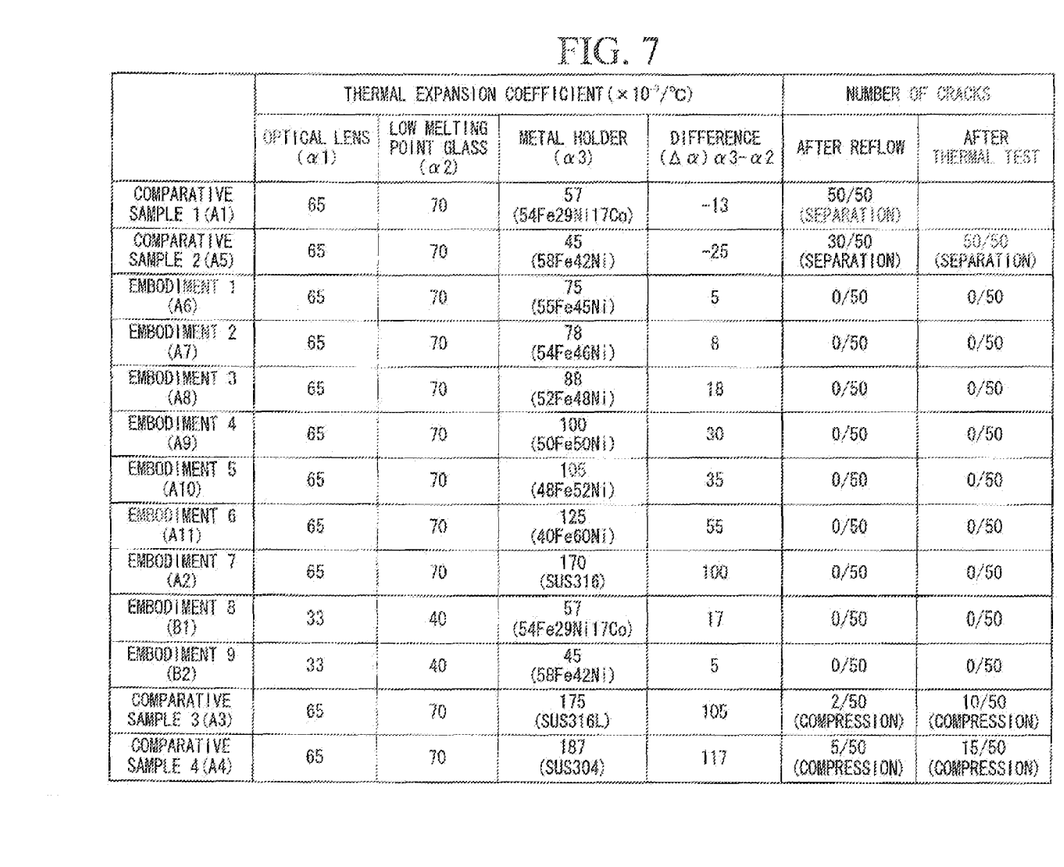
FIG. 7 shows results of measurement for counting the number of cracks formed in an optical lens after reflow and after thermal test with respect to each of various samples.

In the above, the number of cracks occurring in the optical lens 11 of the optical component 10 is counted in the observation, results of which are shown in FIG. 7. FIG. 7 also shows the number of cracks occurring in the optical lens 11 just after the optical lens 11 joins the metal lens holder 12 (b1-b11) upon the reflow of the low melting point glass 13. If a distortion occurs in the optical component 10 after the annealing treatment, it may be enlarged in the heat-cool cycle test, so that cracks may easily occur in the optical lens 11. It is possible to estimate the size of the distortion occurring in the optical lens 11 when joining the metal lens holder 12 on the basis of the existence (or non-existence) of cracks.

FIG. 7 clearly shows that cracks occur due to separation of the surface of the optical lens 11 joining the low melting point glass 13 in the case of Comparative sample 1 and Comparative sample 2 (i.e., optical components A1 and A5) in which the relationship of $\alpha 1 < \alpha 2 < \alpha 3$ is maintained, and the difference (i.e., $\Delta \alpha = \alpha 3 - \alpha 2$) between the thermal expansion coefficient ($\alpha 3$) of the metal lens holder 12 and the thermal expansion coefficient ($\alpha 2$) of the low melting point glass 13 is less than $5 \times 10^{-7}/°$ C. (where $\Delta \alpha < 5 \times 10^{-7}/°$ C.). In addition, cracks occur due to the compressive force directed inside of the optical lens 11 from the surface of the optical lens 11 joining the low melting point glass 13 in the case of Comparative sample 3 and Comparative sample 4 (i.e., optical components A3 and A4) in which $\Delta \alpha$ becomes greater than $100 \times 10^{-7}/°$ C. (where $\Delta \alpha > 100 \times 10^{-7}/°$ C.).

In contrast, no crack occurs in the optical lens 11 after the reflow (or joining process) or after the heat-cool cycle test in the case of Embodiment 1 to Embodiment 6 (i.e., optical components A6 to A11), Embodiment 7 (i.e., optical component A2), and Embodiment 8 and Embodiment 9 (i.e., optical components B1 and B2) in which the relationship of $\alpha 1 < \alpha 2 < \alpha 3$ is maintained, and the difference (i.e., $\Delta \alpha = \alpha 3 - \alpha 2$) between the thermal expansion coefficient ($\alpha 3$) of the metal lens holder 12 and the thermal expansion coefficient ($\alpha 2$) of the low melting point glass 13 ranges between $5 \times 10^{-7}/°$ C. and $100 \times 10^{-7}/°$ C. (where $5 \times 10^{-7}/°$ C.$\leq \Delta \alpha \leq 100 \times 10^{-7}/°$ C.). That is, Embodiment 1 to Embodiment 9 show good results. This is because when the difference between the thermal expansion coefficient of the metal lens holder 12 and the thermal expansion coefficient of the low melting point lens 13 ranges between $5 \times 10^{-7}/°$ C. and $100 \times 10^{-7}/°$ C., small compressive force is normally applied to the optical lens 11, whereby it is possible to avoid the occurrence of cracks and separations in the optical lens 11.

The aforementioned results show that the material for the metal lens holder 12 has the relationship of $\alpha 1 < \alpha 2 < \alpha 3$, and the difference between the thermal expansion coefficients (i.e., $\Delta \alpha = \alpha 3 - \alpha 2$) ranges between $5 \times 10^{-7}/°$ C. and $100 \times 10^{-7}/°$ C., wherein the material is preferably selected from among an alloy b6 (55Fe45Ni) having a thermal expansion coefficient of $75 \times 10^{-7}/°$ C., an alloy b7 (54Fe46Ni) having a thermal expansion coefficient of $78 \times 10^{-7}/°$ C., an alloy b8 (52Fe48Ni) having a thermal expansion coefficient of $88 \times 10^{-7}/°$ C., an alloy b9 (50Fe50Ni) having a thermal expansion coefficient of $100 \times 10^{-7}/°$ C., an alloy b10 (48Fe52Ni) having a thermal expansion coefficient of $105 \times 10^{-7}/°$ C., an alloy b11 (40Fe60Ni) having a thermal expansion coefficient of $125 \times 10^{-7}/°$ C., an alloy b2 (SUS316) having a thermal expansion coefficient of $170 \times 10^{-7}/°$ C., an alloy b1 (54Fe29Ni17Co) having a thermal expansion coefficient of $57 \times 10^{-7}/°$ C., and an alloy b5 (58Fe42Ni) having a thermal expansion coefficient of $45 \times 10^{-7}/°$ C.

4. Structure of Joining Portion of Metal Holder

Figure 3A:
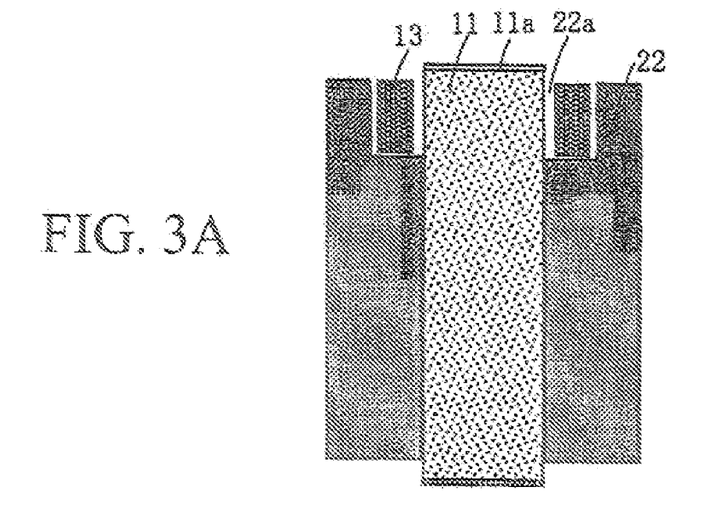
FIG. 3A is a cross-sectional view showing an optical component, which is produced for the comparison, before an optical transmission element joins a metal lens holder.
Figure 3B:
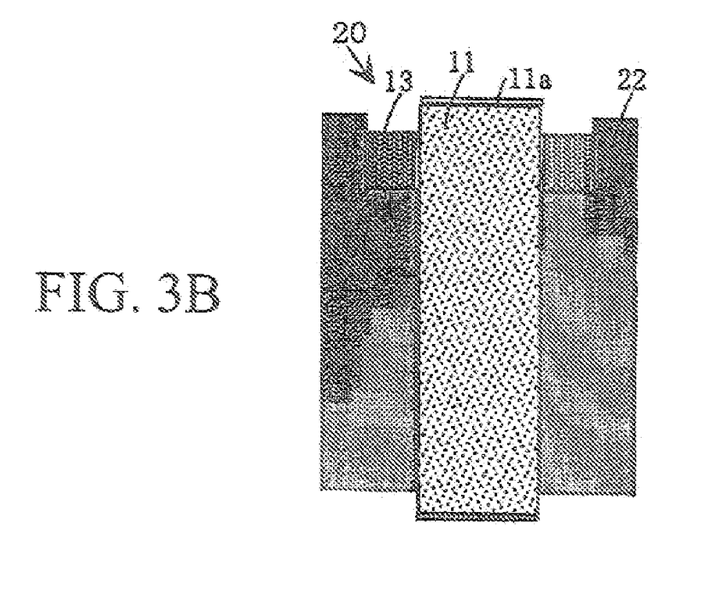
FIG. 3B is a cross-sectional view showing the optical component of FIG. 3A after the optical transmission element joins the metal lens holder.

Next, the difference of airtight property due to the structural difference of the joining portion of the metal holder will be examined. For the comparison, a metal lens holder 22 having a cylindrical shape made of a 50Fe50Ni alloy is produced as shown in FIG. 3A, wherein it has a chamfering portion 22a that is not accompanied with the foregoing tapered portion. As shown in FIG. 3B, the aforementioned optical lens 11 and the low melting point glass preform 13 are used to join the metal lens holder 22, thus producing an optical component 20 (or an optical component X).

Figure 4A:
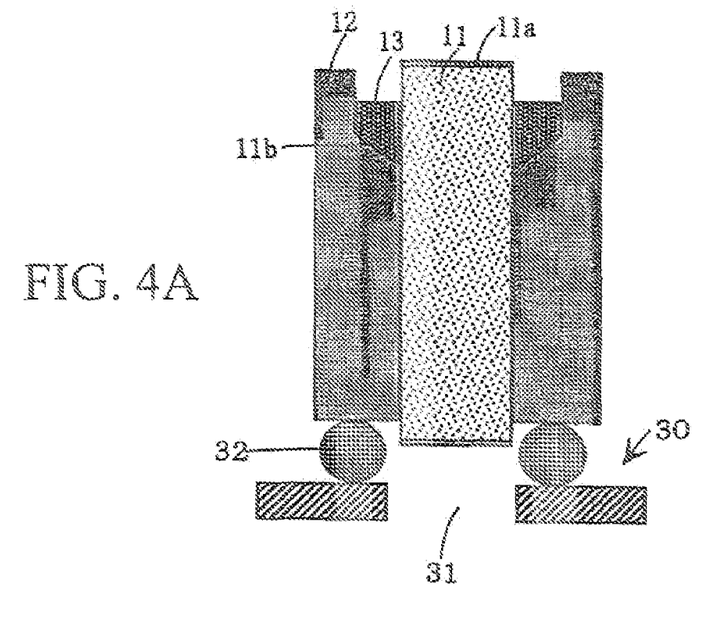
FIG. 4A is a cross-sectional view showing the optical component of FIG. 2B that is arranged on a helium leak detector in airtight testing.
Figure 4B:
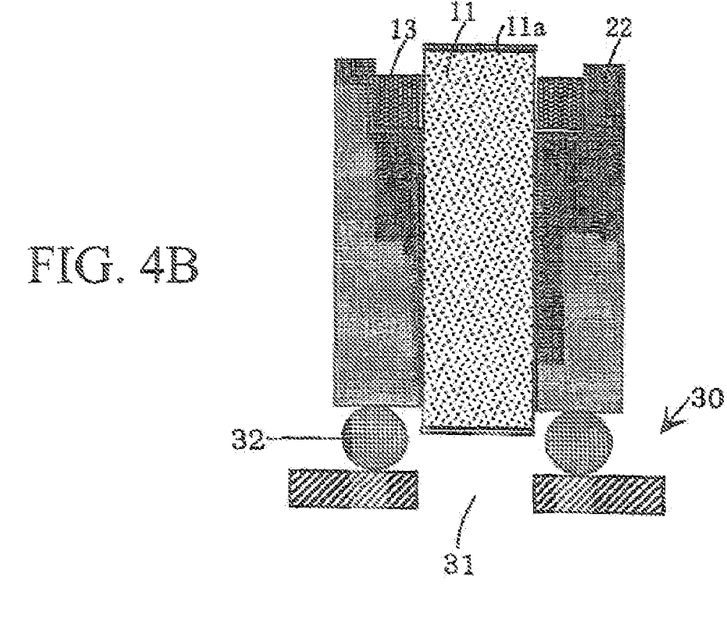
FIG. 4B is a cross-sectional view showing the optical component of FIG. 3B that is arranged on the helium leak detector in airtight testing.

Airtight testing is performed using fifteen sets of the optical component 20 and the optical component 10 (or optical component A9, see Embodiment 4 in FIG. 7) by use of a helium (He) leak detector 30 (produced by Shimadzu Manufacturing Co. Ltd.) as shown in FIGS. 4A and 4B. That is, the optical component A9 is arranged on an opening 31 of the helium leak detector 30 via an O-ring 32 as shown in FIG. 4A, and the optical component X is arranged on the opening 31 of the helium leak detector 30 via the O-ring 32 as shown in FIG. 4B. Herein, helium gas is blown towards the optical component A9 (or X) and is then sucked by the helium leak detector 30. When a gap is formed between the optical lens 11 and the metal lens holder 12 (or 22) so that the optical component A9 (or X) is not airtight, a relatively large amount of helium gas should flow into the helium leak detector 30. The aforementioned airtight testing is performed on each of fifteen samples, which are produced with respect to the optical component A9 and the optical component X respectively. Results are shown in FIG. 8.

Figure 8:
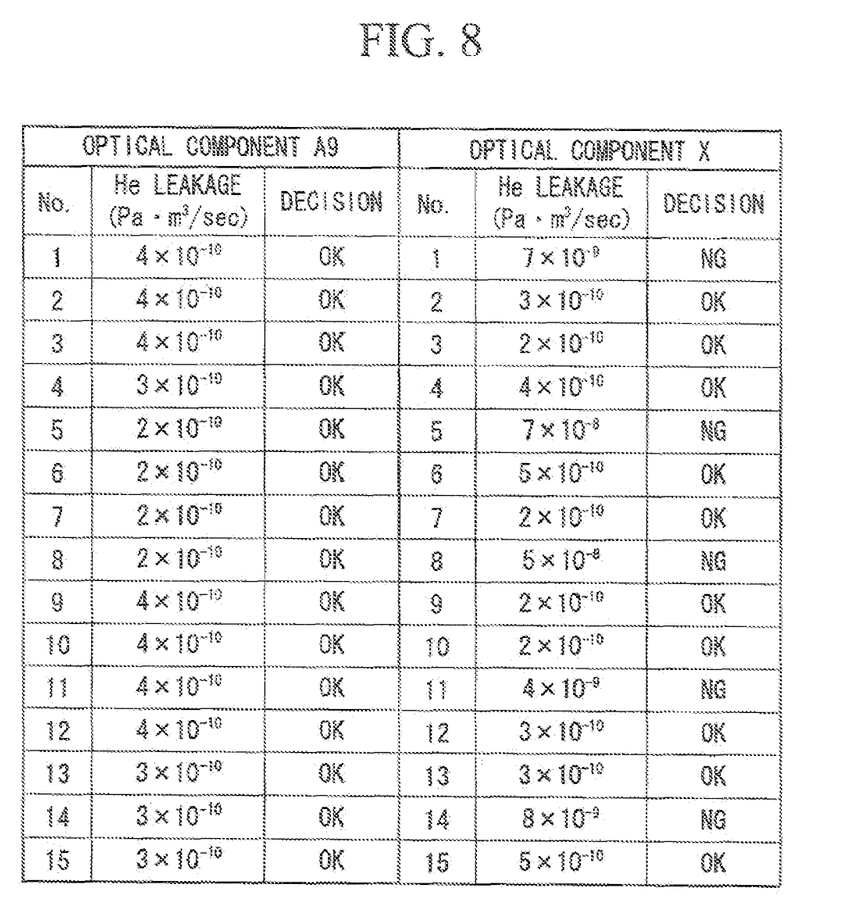
FIG. 8 shows results of airtight testing that is performed with respect to the optical component of FIG. 2B and the optical component of FIG. 3B respectively.

FIG. 8 clearly shows that all samples belonging to the optical component A9 have good airtight property, whereas approximately one-third of samples belonging to the optical component X are deteriorated in airtight property. This is because the optical component A9 has the chamfered portion 12a accompanied with the tapered portion 12b at one end of the metal lens holder 12 so that when the low melting point glass 13 is melted, it flows downwards along the tapered portion 12b due to gravity. As a result, the space defined by the tapered portion 12b is filled with the low melting point glass 13 while the airtight property is maintained.

In the optical component X, the chamfered portion 22a formed at one end of the metal lens holder 22 is not accompanied with the tapered portion, which deteriorates the wetness of the low melting point glass 13 brought into contact with the metal lens holder 22 and which also deteriorates the downward flow of the low melting point glass 13 in the chamfered portion 22a, whereby a non-filled area, which is not filled with the low melting point glass 13, may be formed between the optical lens 11 and the metal lens holder 22.

The aforementioned descriptions are given with respect to the embodiment in which the optical transmission element is composed of LaSF (i.e., a dense lanthanum flint) having a thermal expansion coefficient ($\alpha 1$) of $65 \times 10^{-7}/°$ C., and the joining material is made of a low melting point glass that is mainly composed of $SiO_2$ and $B_2O_3$ having a thermal expansion coefficient ($\alpha 2$) of $70 \times 10^{-7}/°$ C. and is added with PbO, so that the difference between the thermal expansion coefficients (i.e., $\alpha 2-\alpha 1$) is set to $5 \times 10^{-7}/°$ C., and the other embodiment in which the optical transmission element is composed of a borosilicate glass ($SiO_2+B_2O_3+Al_2O_3$) having a thermal expansion coefficient ($\alpha 1$) of $33 \times 10^{-7}/°$ C., and the joining material is made of a low melting point glass that is mainly composed of PbO (at 70% or so) having a thermal expansion coefficient ($\alpha 2$) of $40 \times 10^{-7}/°$ C. and is added with $SiO_2$ and $Al_2O_3$, so that the difference between the thermal expansion coefficients (i.e., $\alpha 2-\alpha 1$) is set to $7 \times 10^{-7}/°$ C.

Of course, the difference between the thermal expansion coefficients of the joining material and optical transmission element (i.e., $\alpha 2-\alpha 1$) is not necessarily limited to $5 \times 10^{-7}/°$ C. and $7 \times 10^{-7}/°$ C. In short, it is necessary to adequately select the optical transmission element and the joining material in such a way that the difference between the thermal expansion coefficients (i.e., $\alpha 2-\alpha 1$) ranges from $5 \times 10^{-7}/°$ C. to $50 \times 10^{-7}/°$ C. If the difference between the thermal expansion coefficients (i.e., $\alpha 2-\alpha 1$) exceeds $50 \times 10^{-7}/°$ C., an excessive amount of compressive stress is imparted to the optical transmission element, in which cracks may easily occur and which may be deteriorated in optical characteristics such as the light extinction ratio. In addition, it is not preferable for the difference between the thermal expansion coefficients (i.e., $\alpha 2-\alpha 1$) to become lower than $5 \times 10^{-7}/°$ C. because the optical component may have a problem in reproducibility.

In addition, the optical transmission element is not necessarily limited to LaSF (i.e., dense lanthanum flint) and borosilicate glass ($SiO_2+B_2O_3+Al_2O_3$). That is, the optical transmission element is preferably selected from among the optical glass, optical crystal, and ceramics, in which the thermal expansion coefficient ($\alpha 1$) ranges from $60 \times 10^{-7}/°$ C. to $80 \times 10^{-7}/°$ C. As the optical glass, it is preferable to selectively use TaF3 (tantalum flint glass, produced by HOYA Co. Ltd.), FK (fluorosilicate crown), PK (phosphate crown), ZK (zinc crown), BaK (barium crown), LaK (lanthanum crown), LF (light flint), SF (dense flint), and LaF (lanthanum flint), etc. In particular, it is preferable to use TaF3.

As the optical crystal, it is preferable to selectively use quartz crystal, rutile (titanium oxide), garnet, alumina ($Al_2O_3$), lithium niobate ($LiNbO_3$), calcium fluoride (or fluorite) ($CaF_2$), lithium fluoride (LiF), magnesium fluoride ($MgF_2$), barium fluoride ($BaF_2$), thallium iodobromide (KRS-5), thallium bromochloride (KRS-6), sodium chloride (NaCl), potassium bromide (KBr), potassium chloride (KCl), cesium iodide (CsI), and zinc selenide (ZnSe), etc.

The joining material is not necessarily limited to the low melting point glass, wherein it can be selected from among the organic adhesive, low melting point glass, and solder, in which the thermal expansion coefficient ($\alpha 2$) ranges between $70 \times 10^{-7}/°$ C. and $90 \times 10^{-7}/°$ C. Herein, the organic adhesive is preferably selected from among polyimide adhesive, epoxy adhesive, UV (ultraviolet) adhesive, acrylic adhesive, and urethane adhesive, etc. In addition, the low melting point glass is mainly composed of $SiO_2$ and $B_2O_3$, which is preferably added with $Al_2O_3$, PbO, $Na_2O$, $K_2O$, BaO, $Li_2O$, etc. As the solder material, it is preferable to selectively use the AuSn alloy solder, PbSn alloy solder, SnAgCu alloy solder, and the like.

The aforementioned embodiments are designed such that the circumferential wall of the upper portion of the optical lens (or optical transmission element) 11 partially joins the metal holder 12 via the low melting point glass (or joining material), wherein the overall circumferential wall of the selected portion of the optical lens does not necessarily join the metal holder. That is, this invention can be actualized such that at least two positions of the circumferential wall of the optical lens 11 join the metal holder 12 via the low melting point glass.

In addition, the aforementioned embodiments are designed to use a ring-like preform of the low melting point glass, which can be replaced with a paste-like low melting point glass.

As this invention may be embodied in several forms without departing from the spirit or essential characteristics thereof, the present embodiments are therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. An optical component
comprising: a metal holder; and
an optical transmission element having an exterior circumferential side-wall that partially joins the metal holder via a joining material, the exterior circumferential side-wall having a first portion and a second portion, said first portion joining the metal holder via the joining material and said second portion directly contacting the metal holder,
wherein stress that occurs when the optical transmission element joins the metal holder is normally exerted on the optical transmission element by the joining material in a direction of compressing the optical transmission element.

2. The optical component according to claim 1, wherein:
the metal holder has a thermal expansion coefficient a3; and
the optical transmission element has a thermal expansion coefficient a1, whose circumferential wall partially joins the metal holder via the joining material, which has a thermal expansion coefficient ca,
wherein the optical transmission element, the joining material, and the metal holder are respectively composed of prescribed materials, which satisfy a relationship of $a1 < 0.2 < a3$.

3. The optical component according to claim 2, wherein a difference between the thermal expansion coefficients of the joining material and the optical transmission element, which is expressed as a2-a1, ranges between $5\times10^{-7}/°$ C. and $50\times10^{-7}/°$ C., and wherein a difference between the thermal expansion coefficients of the metal holder and the joining material, which is expressed as a3-c2, ranges between $5\times10^{-7}/°$ C. and $100\times10^{-7}/°$ C.

4. The optical component according to claim 2, wherein the thermal expansion coefficient a1 of the optical transmission element ranges between $60\times10^{-7}/°$ C. and $80\times10^{-7}/°$ C., the thermal expansion coefficient ca of the joining material ranges between $70\times10^{-7}/°$ C. and $90\times10^{-7}/°$ C., and the thermal expansion coefficient a3 of the metal holder ranges between $80\times10^{-7}/°$ C. and $100\times10^{-7}/°$ C.

5. The optical component according to claim 2, wherein the optical transmission element joins the metal holder at two positions, which are symmetrical to a center axis of the optical transmission element, via the joining material.

6. The optical component according to claim 2, wherein the optical transmission element is selected from among an optical glass, an optical crystal, and ceramics.

7. The optical component according to claim 2, wherein the optical transmission element is constituted by an optical glass composed of TaF3 (tantalum flint glass).

8. The optical component according to claim 2, wherein the metal holder is made of a prescribed material, which is selected from among a Fe—Ni alloy and a Fe—Ni—Co alloy.

9. The optical component according to claim 2, wherein the joining material is selected from among an organic adhesive, a low melting point glass, and a solder.

10. The optical component according to claim 1, wherein the optical transmission element joins the metal holder at two positions, which are symmetrical to a center axis of the optical transmission element, via the joining material.

11. The optical component according to claim 1, wherein the optical transmission element is selected from among an optical glass, an optical crystal, and ceramics.

12. The optical component according to claim 1, wherein the optical transmission element is constituted by an optical glass composed of TaF3 (tantalum flint glass).

13. The optical component according to claim 1, wherein the metal holder is made of a prescribed material, which is selected from among a Fe—Ni alloy and a Fe—Ni—Co alloy.

14. The optical component according to claim 1, wherein the joining material is selected from among an organic adhesive, a low melting point glass, and a solder.

* * * * *

UNITED STATES PATENT AND TRADEMARK OFFICE
CERTIFICATE OF CORRECTION

PATENT NO. : 7,313,292 B2 Page 1 of 1
APPLICATION NO. : 10/941940
DATED : December 25, 2007
INVENTOR(S) : Yoshihiro Hashimoto et al.

It is certified that error appears in the above-identified patent and that said Letters Patent is hereby corrected as shown below:

In the Claims:

At column 12, line 58, "a3" should read -- $\alpha 3$ --

At column 12, line 61, "a1" should read -- $\alpha 1$ --

At column 12, line 63, "ca" should read -- $\alpha 2$ --

At column 12, line 67, "a1<0.2<a3", should read -- $\alpha 1 < \alpha 2 < \alpha 3$ --

At column 13, line 4, "a2-a1", should read -- $\alpha 2 - \alpha 1$ --

At column 13, line 4, "5x10"PC", should read -- $5 \times 10^{-7}/°C$ --

At column 13, line 5, "50x10"/°C.", should read -- $50 \times 10^{-7}/°C$, --

At column 13, line 7, "a3-c2", should read -- $\alpha 3 - \alpha 2$ --

At column 13, line 8, "100x10⁷/°C", should read -- $100 \times 10^{-7}/°C$ --

At column 13, line 10, "a1", should read -- $\alpha 1$ --

At column 13, line 13, "90x10"PC", should read -- $90 \times 10^{-7}/°C$ --

At column 13, line 14, "a3", should read -- $\alpha 3$ --

At column 13, line 15, "80x10⁷PC", should read -- $80 \times 10^{-7}/°C$ --

At column 13, line 15, "100x10"7/.°C", should read -- $100 \times 10^{-7}/°C$ --

Signed and Sealed this

Twenty-third Day of March, 2010

David J. Kappos
*Director of the United States Patent and Trademark Office*